(12) United States Patent
Polster

(10) Patent No.: US 8,002,480 B2
(45) Date of Patent: Aug. 23, 2011

(54) MECHANICALLY ACTIVATED REMOTE DEVICE FOR ACTUATING CAMERA

(76) Inventor: James Polster, University Heights, OH (US)

(*) Notice: Subject to any disclaimer, the term of this patent is extended or adjusted under 35 U.S.C. 154(b) by 148 days.

(21) Appl. No.: 12/378,041

(22) Filed: Feb. 9, 2009

(65) Prior Publication Data

US 2010/0202769 A1    Aug. 12, 2010

(51) Int. Cl.
*G03B 17/00* (2006.01)
(52) U.S. Cl. ............................................. 396/425
(58) Field of Classification Search .................. 396/59, 396/419, 420, 425, 428, 502–504, 544
See application file for complete search history.

(56) References Cited

U.S. PATENT DOCUMENTS

| | | | | |
|---|---|---|---|---|
| 2,742,836 A | * | 4/1956 | Louie | 396/502 |
| 2,935,006 A | | 5/1960 | Everetts | |
| 2,982,194 A | * | 5/1961 | Hannafin | 396/504 |
| 4,496,228 A | | 1/1985 | Schmidt | |
| 4,794,414 A | * | 12/1988 | Kozina et al. | 396/504 |
| 5,065,249 A | | 11/1991 | Horn et al. | |
| 5,089,836 A | | 2/1992 | Chern | |
| 5,281,988 A | * | 1/1994 | Martin | 396/59 |
| 5,768,645 A | | 6/1998 | Kessler | |
| 6,007,259 A | | 12/1999 | Mori et al. | |
| 6,056,450 A | | 5/2000 | Walling | |
| 6,076,978 A | | 6/2000 | McIlvenna | |
| 6,384,863 B1 | | 5/2002 | Bronson | |
| 7,204,650 B2 | | 4/2007 | Ghanouni et al. | |
| 7,217,044 B1 | | 5/2007 | Marks, Jr. | |

OTHER PUBLICATIONS http://www.kaboodle.com/reviews/quikpod.
http://www.kaboodle.com/reviews/pixpal-camera-extender-42-inch.
http://www.kaboodle.com/reviews/xshot-telescoping-digital-arm.
X-Treme Geek. Catalog No. X744-W2. p. 18. Holiday 2007.

* cited by examiner

*Primary Examiner* — W. B. Perkey
(74) *Attorney, Agent, or Firm* — D. Peter Hochberg; Sean F. Mellino; Daniel J. Smola

(57) ABSTRACT

A device having a support in the form of a base plate for being fixed to a camera such as with the receptacle for a tripod in the base of the camera, a slotted tube extending from the support for holding a spring loaded plunger rod and an actuator pin extending through the plunger rod and through opposing slots in the slotted tube. The plunger is moved by a retractable line from a remote position to cause movement of the actuator pin to actuate the shutter release of the camera.

11 Claims, 7 Drawing Sheets

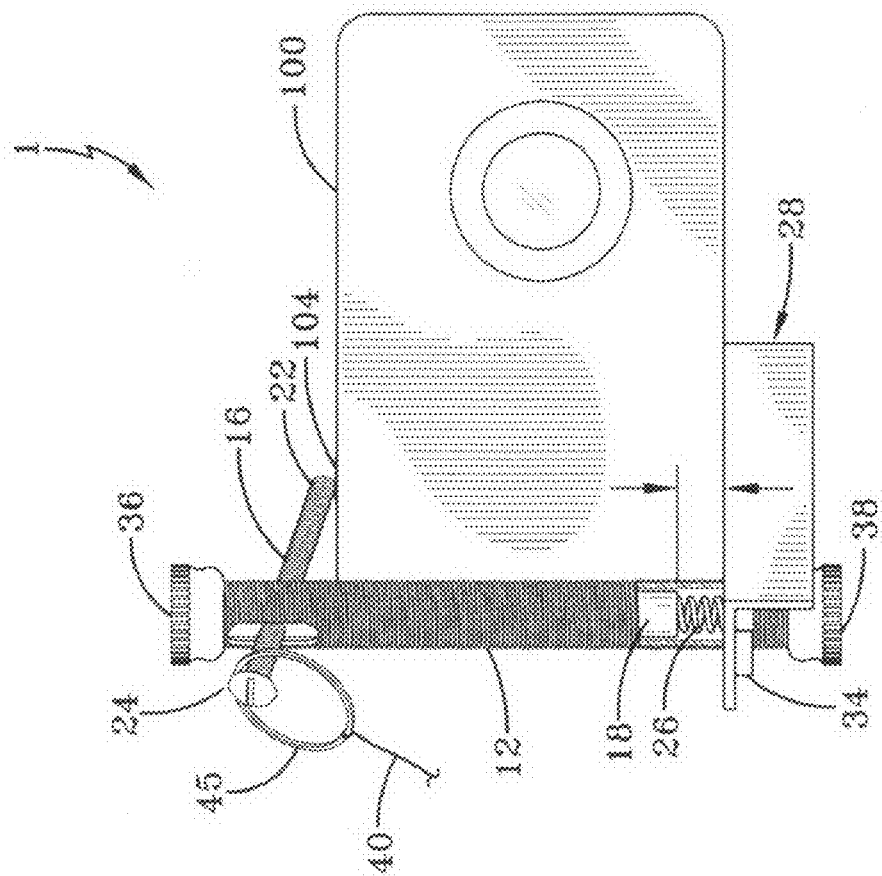
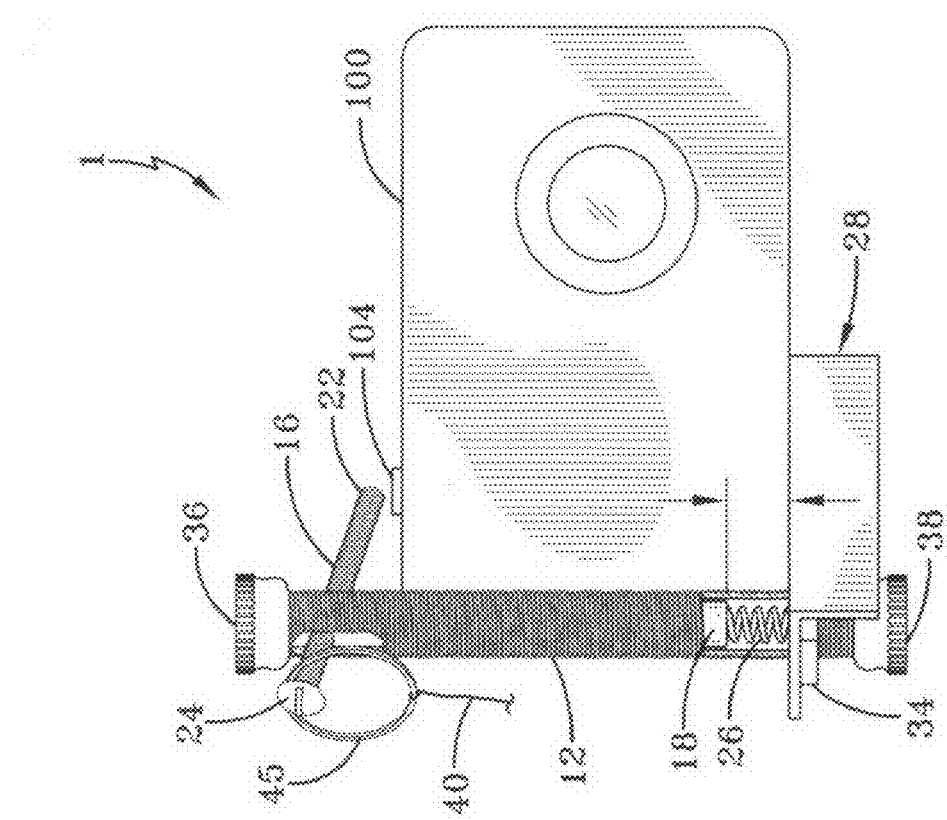
FIG-5
FIG-6

MECHANICALLY ACTIVATED REMOTE DEVICE FOR ACTUATING CAMERA

BACKGROUND OF THE INVENTION

1. Field of the Invention

The invention relates to a mechanically activated remote photography and video device. More particularly, the invention relates to a mounting assembly which allows attachment of a camera therein, allows the camera to be held a distance from the operator, and allows the operator to actuate the camera to take a photograph or video therewith.

2. Description of the Prior Art

Certain construction, repair, inspection and maintenance tasks employ photography and/or video to record the current state of a device or structure. The photographs and/or video may then be used simply for recordation and later comparison with photographs taken at a different time, or may be brought to experts who are better suited for analysis but cannot travel into the field to view the actual subject matter. Even certain recreational activities such as bird watching employ the use of a camera to photograph or record various types of birds and their environment.

However, even the photography or recordation of certain structures, devices and environments is difficult. Often it is difficult to reach the desired area or very little space is available to allow the photographer to access the area in order to take a photograph or video. Thus, often these locations cannot be photographed or recorded without the use of additional equipment such as a ladder or sophisticated camera equipment. Sometimes these areas cannot be photographed or recorded at all. The use of a ladder subjects the operator to dangers from falling, and either hurting himself or herself and potentially damaging the camera. Sophisticated camera equipment is very expensive and cannot be afforded by most camera owners.

Several devices have been proposed which aid the operator by holding the camera or recorder (cameras, recorders, camcorders and other image recording devices are hereinafter generally referred to as "cameras."). However, these devices are all aimed at allowing the camera to be held perfectly still, or for ensuring fluid motion when holding a camera for taking videos. None of these devices are well suited for remote photography of hard to reach subject matter.

A number of devices exist for taking self-portraits. Some of the devices are known as the QuikPod, PixPal and Xshot Telescoping Digital Camera Arm. These hand-held extendable devices allow a person include himself or herself in a photo without another person holding the camera. These devices employ a universal mount which fits all cameras with a standard tripod fitting. However, none of these devices actuate the shutter button of the camera. These devices can only be used in conjunction with the delayed picture function of the camera.

Fiber optic camera systems are available which allow images to be obtained from hard to reach, and even microscopic locations. Due to the high cost of these systems, there use has been limited generally to the field of medicine.

U.S. Pat. No. 5,089,836 to Chern discloses a remote control shutter device for a camera. Chern employs a motor in conjunction with reduction gearing to operate the remote control shutter device. The device of Chern is complicated and is expensive to manufacture.

U.S. Pat. No. 6,076,978 to McIlvenna discloses a remote photography device. McIlvenna utilizes mounting plates for mounting a camera to a pole or mast while the present invention employs female threads. The mounting plates of McIlvenna also have an arm built in, while the present invention does not use a built-in arm. This patent discloses planar adjustment of the actuator which only moves left and right, not up and down. McIlvenna discloses that the pole is part of the invention and the line or cable is part of the device. The present invention uses a pole as an interface but not as part of the present invention. McIlvenna is more expensive to manufacture than the preferred embodiment of the present invention.

There exists a need for a simple cost-effective mechanical device which can be used to allow a user to operate a still or video camera at a distance away from the user. It is to this need that the present invention is directed.

SUMMARY OF THE INVENTION

It is an object of the invention to produce a mechanically activated remote device for actuating camera, which allows a camera to be used in a location where not enough space is provided to allow the operator to personally hold and use the camera.

A further object of the present invention is to provide a device having a telescoping pole which may be extended through a narrow passageway to bring the camera to a location therein.

Another object of the present invention is to provide a device which can be used with a still or video camera.

It is another object of the invention that the camera is remotely actuable.

A further object of the present invention is to provide a device which can be used with an existing cable reel to actuate the camera from a remote distance.

Still another object of the present invention is to provide a device which can be used to photograph the condition of a home or building's roofing.

Another object of the present invention is to provide a device which can be used to show the state of a sewer or drain.

Yet another object of the present invention is to provide a device which can be used for emergency purposes to locate people trapped in collapsed buildings, tunnels or the like.

A further object of the present invention is to provide a device which allows a user to take a self portrait from a distance further away than arm's length.

A more general object is to provide a system for activating a camera at generally inaccessible heights, generally unacceptable depths, and in generally inaccessible locations where it is difficult or impossible to hold a camera for operation in the normal manner.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

The foregoing objects are achieved according to the preferred embodiment of the invention by the provision of a mounting assembly which can be used with existing cameras and camera equipment, such as monopods, bipods, tripods, telescoping poles and other types of camera mounts. The mounting assembly includes a tube attached to a base plate. A plunger and spring are provided inside the tube. The tube includes slots for allowing an actuator pin to pass through the slots and plunger for engaging the shutter button of a camera.

BRIEF DESCRIPTION OF THE DRAWINGS

Other characteristics and advantages of the present invention will emerge from reading the detailed description hereinbelow of nonlimiting embodiments of the invention, and examining the attached drawings wherein:

FIG. 5 is a front view of a camera with the mounting assembly according to the present invention with a portion in cross section to reveal a portion of the interior of the preferred embodiment.

FIG. 6 is a front view of a camera with the mounting assembly according to the present invention showing the shutter button of the camera being depressed by the actuator pin.

DETAILED DESCRIPTION OF THE PREFERRED EMBODIMENT

Figure 1:
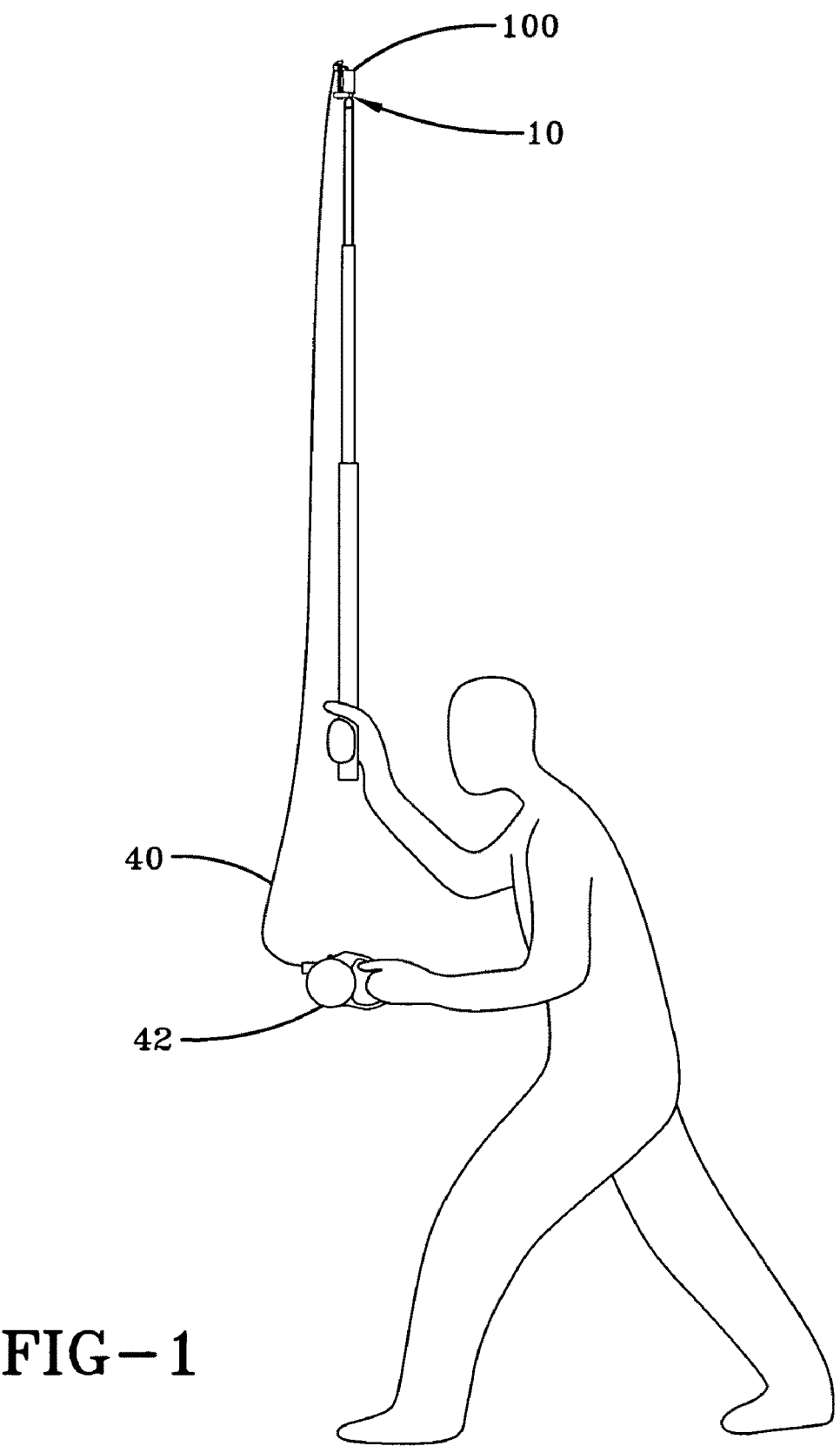
FIG. 1 is a perspective view showing a person using the present invention.

FIG. 1 is a perspective view showing a person using the present invention. It shows the person holding a mounting assembly 10 with a camera 100 mounted on its end portion, and a reel 42 from which extends a line 40.

Figure 2:
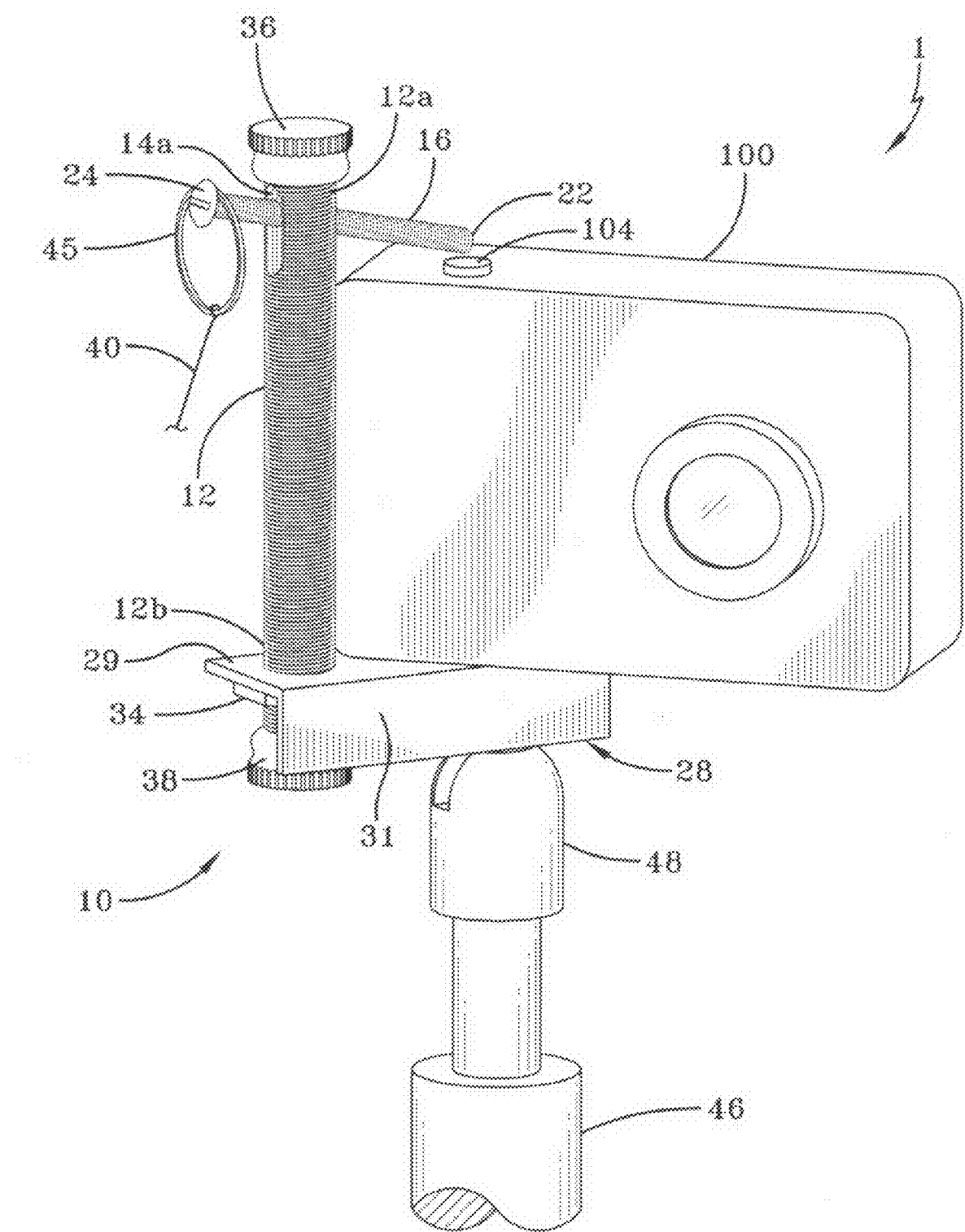
FIG. 2 is a perspective view of the front of a camera with a mechanically activated remote device according to the invention for actuating camera according to the present invention.
Figure 3:
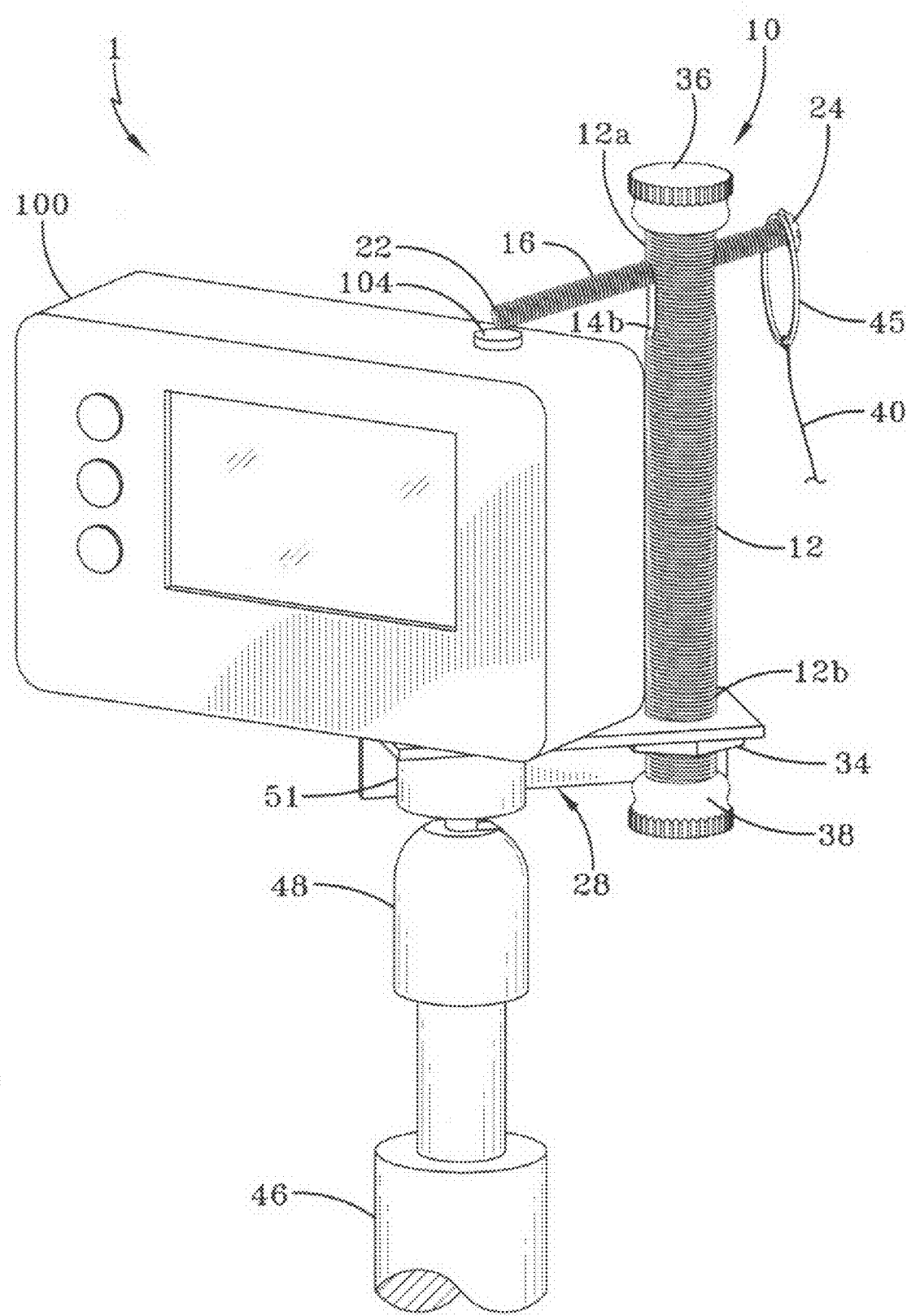
FIG. 3 is a perspective view of the rear of the camera shown in FIG. 1 with a mechanically activated remote device for actuating camera according to the present invention.
Figure 4:
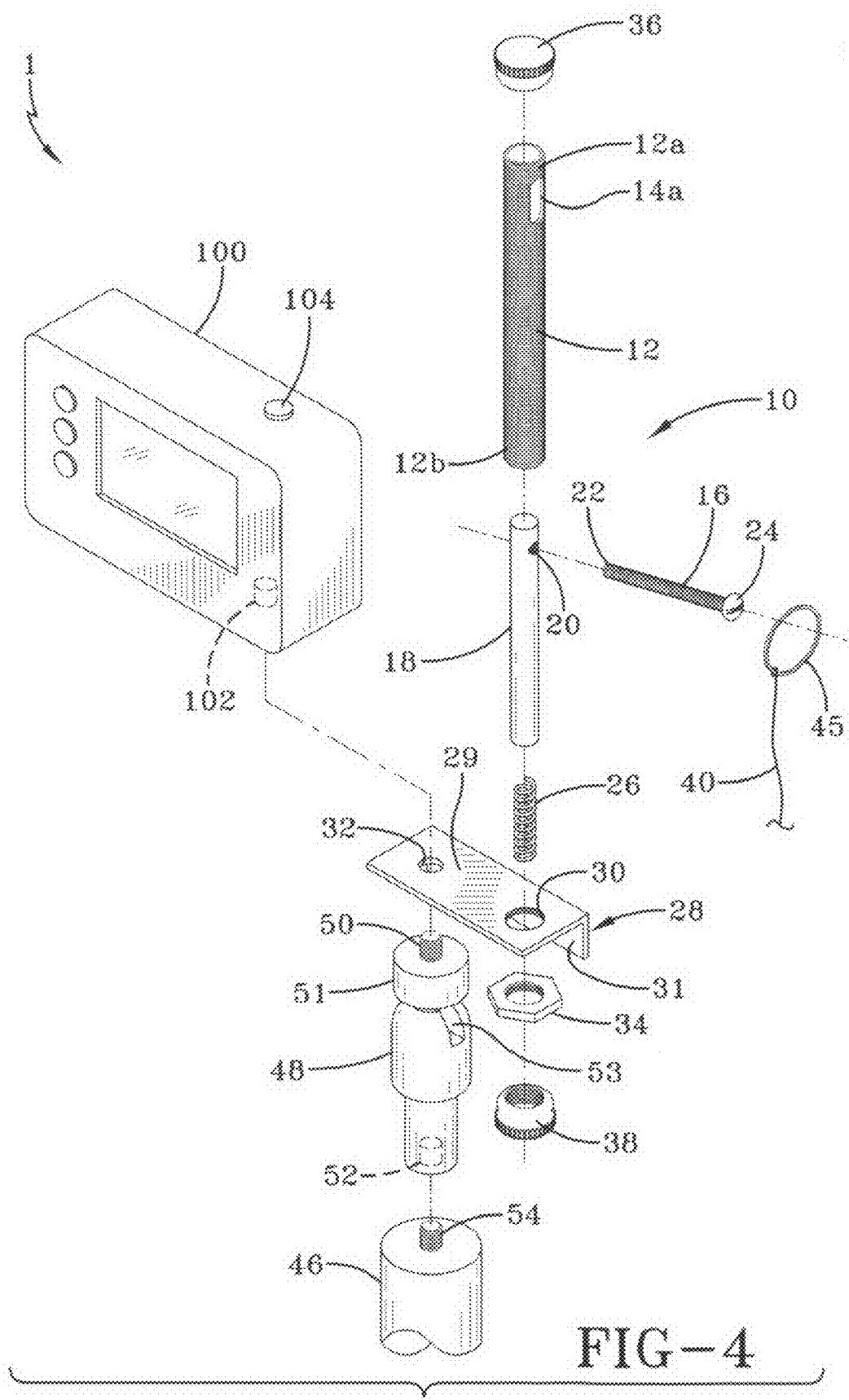
FIG. 4 is an exploded, perspective view of the rear of a camera with a mechanically activated remote device according to the invention for actuating camera as shown in FIG. 3.
Figure 7:
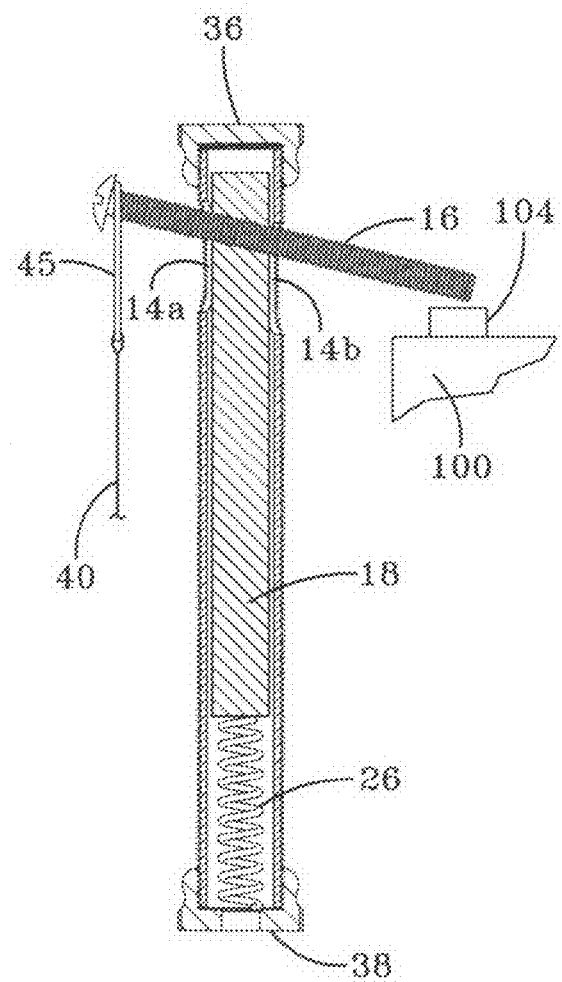
FIG. 7 is a partial section view of mounting assembly according to present invention as shown in FIG. 5.
Figure 8:
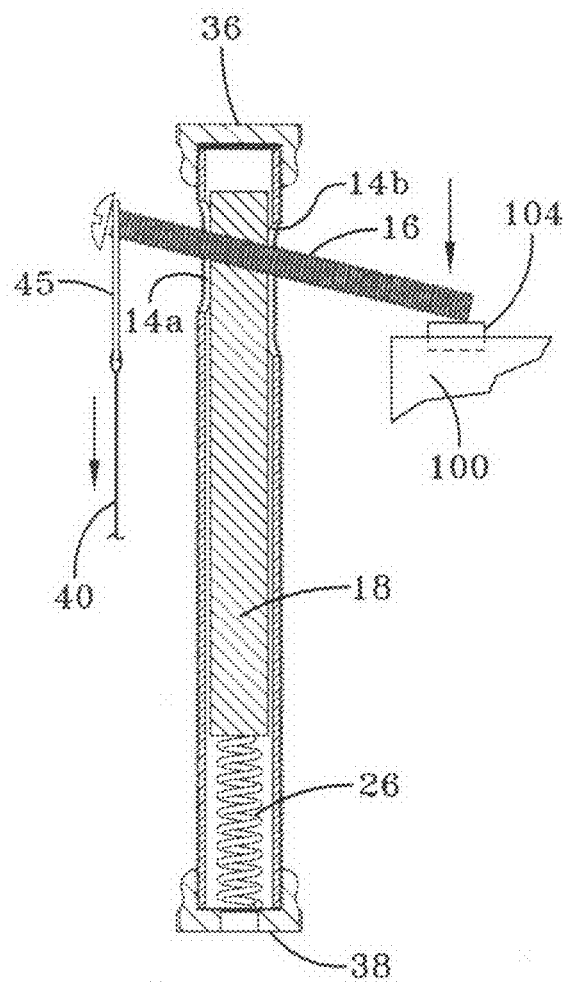
FIG. 8 is a partial section view of mounting assembly according to present invention as shown in FIG. 6.

With reference to FIGS. 2-4, a mounting assembly 10 is illustrated for a mechanically activated remote actuating device 1 for actuating camera 100. Mounting assembly 10 includes a threaded tube 12 having an upper end 12a and a lower end 12b. Although not shown, tube 12 does not have to be threaded. Threaded tube 12 also has opposing, parallel slots 14a, 14b near upper end 12a to accommodate a threaded actuator pin 16. Opposing slots 14a, 14b are the same length, but opposing slot 14b is located, further from upper end 12a than opposing slot 14a. Slots 14a and 14b are parallel to the longitudinal axis of tube 12. Although not shown, it is also possible that opposing slots 14a, 14b may be different lengths, as long as the top of opposing slot 14a is located above the top of opposing slot 14b. Mounting assembly 10 further includes a plunger rod 18, which rides in threaded tube 12 at lower end 12b, and is coaxial with the longitudinal axis of tube 12. Plunger rod 18 includes a threaded hole 20 which receives threaded actuator pin 16, pin 16 being threadingly receivable in hole 20. Threaded actuator pin 16 includes a contact end 22 and a top end 24. Hole 20 is angled to allow threaded actuator pin 16 to be angled with respect to threaded tube 12; that is, actuator pin 16 is threaded through hole 20, and contact end 22 is below top end 24. A spring 26 is located in threaded tube 12 at lower end 12b after plunger rod 18 has been inserted in tube 12. Spring 26 is mounted on a stop, as explained below, and imposes an upward biasing force on plunger rod 18 toward upper end 12a.

Mounting assembly 10 also includes a support in the form of a base plate 28. Base plate 28 has a flat platform 29, a vertical leg portion 31 and threaded hole 30 through platform 29 having an axis to accommodate threaded tube 12. Although base plate 28 has been described as having a leg portion 31, the leg portion is not necessary. For example, if flat portion 29 of base plate 28 were thick enough to prevent deflection, the vertical leg portion 31 could be omitted. Base plate 28 also has camera mounting structure in the form of a hole 32 for alignment with the tripod hole of a camera as discussed below. A lock nut 34 has internal threads corresponding to the threads on tube 12, and is used to prevent base plate 28 from disengaging threaded tube 12. Alternatively, if hole 30 is not threaded, an additional lock nut (not shown) would be placed on the opposite side of base plate 28 to secure base plate 28 to threaded tube 12.

Threaded tube 12 also includes a top cap 36 and a bottom cap 38. Top cap 36 is threaded and screwed on threaded tube 12 at upper end 12a. Top cap 36 prevents plunger rod 18 from exiting upper end 12a of threaded tube 12. Bottom cap 38 is threaded and screwed on threaded tube 12 at lower end 12b. Bottom cap 38 prevents spring 26 from exiting lower end 12b of threaded tube 12.

Figure 9:
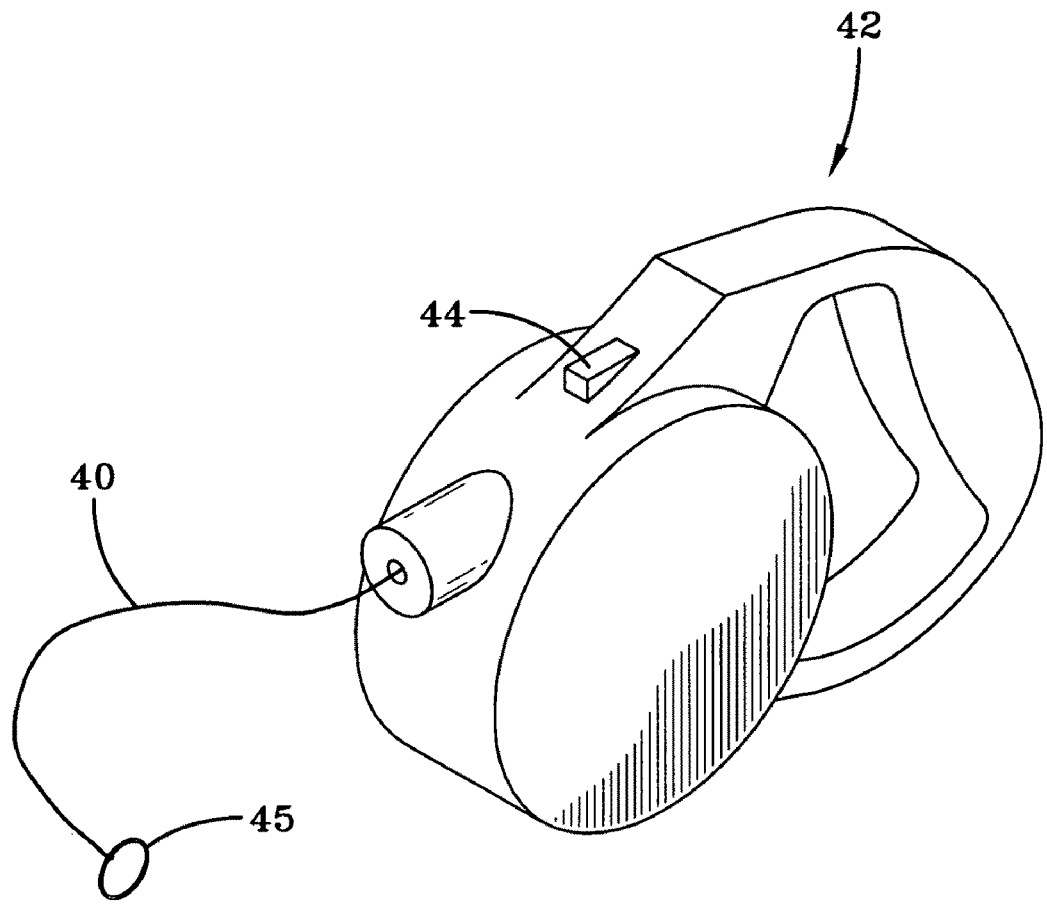
FIG. 9 is a perspective view showing a typical cable reel that may be used with the present invention.

In addition to mounting assembly 10, mechanically activated remote actuator device 1 can include any type of actuating structure which can reach and pull down threaded actuator pin 16. In a preferred embodiment shown in FIG. 9, a retractable cable 40 which can be attached near top end 24 of threaded actuator pin 16. Retractable cable 40 may be stored in a separate cable reel 42. Cable reel 42 can function in a manner similar to a reel for a tape measure, wherein a spring-loaded hub pulls retractable cable 40 inward for storage. A lock switch 44 fixes the position of the retractable cable 40 with respect to cable reel 42. A cable loop 45 is attached at the end of cable 40 which allows for attachment to threaded actuator pin 16.

A mast or telescoping pole 46 is provided to allow a user to hold camera 100 at a distance away from the user. Mast 46 typically can be adjusted from 1 foot to 24 feet in length. However, mast 46 may be longer than 24 feet. A pivotable camera mount 48 is used to connect 46 with camera 100. Virtually all point-and-shoot film and digital cameras have a threaded female mounting hole on the bottom of the camera for accommodating a monopod, bipod, tripod or similar structure. Pivotable camera mount 48 includes a threaded male portion 50 which connects to a threaded female mounting hole 102 having a longitudinal axis on the bottom of camera 100. Pivotable camera assembly mount 48 also has a flange 51 through which threaded male portion 50 extends. A semi-cylindrical recess 53 is located in the end of camera mount 48 proximal flange 51 for defining a 180° rotational path for male portion 50 to tilt. Pivotable camera assembly mount 48 allows camera 100 to be rotated 360° about the longitudinal axis of hole 102 and tilted between zero and 90°. Pivotable camera assembly mount 48 also includes a threaded female portion 52 for connecting to a threaded male portion 54 extending along the longitudinal axis of telescoping pole 46.

The following will describe the assembly of the mechanically activated remote actuator device 1 with camera 100, the camera having a shutter release 103 on the camera's top portion. Top cap 38 is screwed on upper end 12a of threaded tube 12. Plunger rod 18 is inserted into threaded tube 12 at lower end 12b. Threaded hole 20 of plunger rod 18 is aligned with opposing slots 14a, 14b of threaded tube 12. Since hole 20 is angled, the higher portion of hole 20 is aligned with opposing slot 14a, while the lower portion of hole 20 is aligned with slot 14b. Threaded actuator pin 16 is inserted through opposing slot 14a, threaded into and through plunger rod 18 and threaded through opposing slot 14b. The amount that threaded actuator pin 16 is threaded through opposing slots 14b will depend upon the location of the shutter mechanism of camera 100, which can be adjusted after camera 100 is mounted to mounting assembly 10 by simply rotating activator pin 16 around its longitudinal axis.

Next, base plate 28 is attached to threaded tube 12 at lower end 12b by screwing threaded tube 12 into threaded hole 30. If hole 30 is not threaded, an additional lock nut would first be screwed onto threaded tube 12. After base plate 28 has been screwed onto threaded tube 12, lock nut 34 is screwed onto threaded tube 12 until it is flush with base plate 28. Base plate 28 will be able to be adjusted at a later time based on how far above platform 29 of base plate 28 the shutter release 104 of camera 100 is located when camera 100 is mounted on mounting assembly 10. Next, spring 26 is inserted into threaded tube 12 at lower end 12b until spring 26 contacts plunger rod 18. Upon contact with plunger rod 18, spring 26 is compressed by placing bottom cap 38 on lower end 12b and screwing bottom cap 38 until it is tight.

Next, camera 100 is mounted to mounting assembly 10 in the following manner. The axis of hole 32 is aligned with the axis of female mounting thread 102 on the bottom of camera 100, and platform 29 of base plate 28 is flush with the bottom of camera 100. Mounting assembly 10 must be situated so threaded actuator pin 16 is directly above a shutter release 104 of camera 100 (the term "shutter release" is being used even if camera 100 does not employ a shutter). The amount of clearance between threaded actuator pin 16 and shutter button 104 is less than the length of opposing slots 14a, 14b. This will allow contact end 22 of threaded actuator pin 16 to contact shutter button 104 when threaded actuator pin 16 is pulled down as described below. Although not shown, mounting assembly 10 can accommodate all types of still and video cameras. Since all cameras have different heights, i.e. the measurement from the bottom of the camera to the top of the camera where the shutter release is located, mounting assembly 10 can be adjusted by either shortening or lengthening the distance between platform 29 of base plate 28 and threaded actuator pin 16 to accommodate cameras of any height. This can be done be simply screwing or unscrewing lock nut 34 and turning tube 12 in 360° increments to raise or lower tube 12 to move actuator pin 16 and its contact end 22 toward or away from upper end 12a of threaded tube 12. If necessary, threaded tube 12 may be lengthened to accommodate a larger camera. Similarly, plunger rod 18 and spring 26 would also have to be adjusted in size to allow threaded actuator pin 16 to have enough travel to actuate the camera as described below.

It is not necessary that actuator pin 16 and hole 20 be threaded. It is also possible that hole 20 in plunger rod 18 be narrow enough to engage pin 16 and hold it in place in order to locate pin 16 for engagement with shutter release 104. Pin 16 could also be held in receiving hole 20 by means other than threading, such as a set screw located in a threaded hole in the top of plunger rod 18.

While mounting assembly 10 is in the aforementioned position, threaded male portion 50 of pivotable camera mount 48 is placed through hole 32 and is screwed into female mounting thread 102 of camera 100 until flange 51 is flush with the bottom of platform 29 of base plate 28. Threaded male portion 54 of mast 46 is screwed into threaded female portion 52 of pivotable camera assembly mount 48 to connect mast 46 to pivotable camera mount 48.

The following will describe the operation of the mechanically activated remote actuator device for camera 1. After camera 100 has been mounted in mounting assembly 10 as described above, camera 100 is turned on and is configured by a user to be able to take a picture. Next, the user extends mast 46 to a desired length. Once mast 46 is extended but before the user holds mast 46 at the desired position to take a picture, the user attaches loop 45 of retractable cable to threaded actuator pin 16, and pulls cable reel 42 so retractable cable 40 extends approximately a similar distance as mast 46 is extended.

Since cable reel 42 allows retractable cable 40 to be extended, no tension is placed on threaded actuator pin 16. When mechanically activated remote actuator device 1 for camera 100 is in the desired position to take a picture, the user locks retractable cable 40 in place by pressing lock switch 44 to fix the position of retractable cable 40 with respect to cable reel 42. When the user is ready to take a picture, the user pulls down on cable reel 42 causing cable loop 45 to pull threaded actuator pin 16 down against the force of spring 26 and contact shutter release 104 of camera 100 to take a picture. After the shutter release 104 has been depressed and a picture has been taken, the user can release cable reel 42 allowing threaded actuator pin 16 to be forced upward by spring 26 to its original position. These steps can be repeated to take multiple pictures. If camera 100 is a video camera, the user would maintain contact end 22 of actuator pin 16 against shutter release 104.

In an alternative embodiment, retractable cable 40 is located partially within threaded tube 12. In this embodiment, plunger rod 18 would have an additional hole in which the end of cable 40 is threaded through and tied and secured. At the same time, cable 40 runs through the center of spring 26. Bottom cap 38 would have a hole in the bottom to allow cable 40 to pass through it as well. The hole in bottom cap 38 must be large enough for cable 40 to pass through, but cannot be larger than the diameter of spring 26. In other words, bottom cap 38 must still prevent spring 26 from exiting threaded tube 12. Cable 40 is still attached in the same manner to cable reel 42 as described above. When the user locks cable 40 in place by pressing lock switch 44, and subsequently pulls down on cable 40, plunger rod 18 is also pulled down within threaded tube 2 until threaded actuator pin 16 contacts shutter button 104 of camera 100.

In a different alternative embodiment, an eye hook or similar fastener would be threaded into a hole at the bottom of plunger rod 28. The fastener would pass through the hole at the center of bottom cap 38 and through spring 26 before being threaded into the hole at the bottom of plunger rod 18. Cable 40 would be attached to the fastener at this point, and would be used to actuate pin 16 to operate shutter release 104.

There are a number of additional items which are not shown that can be used in conjunction with mechanically activated remote actuator device for camera 1 as described below.

A rubber stopper or similar cushioning structure can be placed on the end of threaded actuator pin 16 to prevent scratching or damage to shutter button 104 of camera 100.

An outrigger can be placed on mounting assembly to help the user provide additional stability or to support to device 1 or to hold the device 1 in the desired position.

A laser can be employed to inform the user when the camera is correctly positioned. The laser can be mounted on base plate 28, threaded tube 12 or some other part of mounting assembly 10.

To protect mounting assembly 10 and camera 100 from damage while holding mechanically activated remote actuator device for camera 1 at a distance from the user, structure such as a cage may be used to shield the mounting assembly 10 and camera 100 from inadvertent contact with the surrounding environment. For example, if a bird watcher is holding the device 1 near branches in a tree, the cage will protect camera 100 from damage from the tree and will ensure mounting assembly 10 is not damaged or moved out of position with camera 100. Similarly, if the device 1 is being inserted into rubble from a collapsed building, the cage will prevent damage to the camera 10 and mounting assembly 10 if device 1 inadvertently contacts the rubble.

The device 1 can also employ wheels for the camera to be positioned underneath a structure such as a house or car. The wheels would allow the user to simply roll the device underneath the desired object rather than trying to hold the device for fear of damaging the mounting assembly 10 and camera 100. The wheels could be placed on the mounting assembly 10 or on mast 46. Additionally, if a cage or other protective structure is employed as mentioned above, the wheels could be attached to the cage itself.

The device 1 can be used with existing camera equipment such as monopods, bipods, tripods and other types of camera mounts. For example, the present invention can be used with the Gorillapod®. The Gorillapod® is a type of tripod which has flexible, gripping legs which can wrap around almost any surface or structure. A user can place camera 100 in a desired stationery position using the Gorillapod® and then use cable reel 40 take pictures at a distance from the Gorillapod®, to eliminate any unwanted movement caused by the user in the picture environment.

The present invention can be used for a multitude of various applications where the camera is to be held at a distance from the operator, and allows the operator to actuate the camera to take a photograph or video therewith.

The device 1 can be used for various roofing purposes. Climbing on a roof poses many dangers for a person. Some roofs are even inaccessible for a person, and may be weak, such as after a fire, and there may be a danger of the roof collapsing due to the user's weight. The device 1 can be used to take pictures of the roofing shingles to assess the wear or curling of the shingles without having the person to be physically on top of the roof. Similarly, the gutters can be inspected for clogs or blocks without the use of a ladder to determine if they need to be cleaned.

Surveying a crawl space in a home can be easily done with the present invention. There may be a need to determine if vermin, such as mice or other animals, have invaded the crawl space. The present invention can be used with wheels as described above to roll the device into the crawl space and take pictures.

Plumbing and sewers are difficult to access, if at all, and cleaning or removing blockages from these are usually left to the professionals who have expensive equipment to deal with this situation. With the present invention, a person can take a picture of a potential blockage by extending the device down into a plumbing fixture or sewer. Thus potential blockages may be caught before severe damage is caused from fully blocked plumbing or sewers.

The device can also be used for emergency situations. In the event of a collapsed building from an earthquake or other natural disaster, the early search for survivors is critical. Typically, the rubble from a collapsed building prevents rescuers from accessing these areas and determining if people are trapped underneath. The present invention can be used to reach into collapsed areas to take pictures and or record video and sound to determine whether any people are trapped.

The device can also be used for police or military purposes. Police officers and soldiers often have to clear buildings from dangerous people, bombs, booby traps and the like. Since the device allows for extension and rotation of the camera, a police officer or soldier can use the device to take pictures around corners to assess the situation and determine if it is safe to proceed.

The device can also be used for recreational purposes. Birdwatchers typically use binoculars or similar devices for viewing various types of birds in their natural habitat. Since these birds are typically high up in trees, the present invention can be use to take pictures or video of the birds without having to climb the tree or use a ladder.

The device can also be used for self portraits. A user desiring to have a picture taken of himself or herself typically has another person take the picture. However, if no other person is available to take the picture, the person must hold the camera with one arm at a distance from himself or herself. Typically the distance is not far enough and results in poor pictures due to the angle of the person's arm and the person's aim of the camera. The present invention can be used to extend the camera at a sufficient distance away from a user to take a self-portrait or a group picture.

Although the biasing device in the form of spring 26 biases plunger rod 18 upward to in turn bias actuator 16 to the non-actuating position, another arrangement is possible where a biasing device biases the actuator to the actuating position where a release holds the actuator (or a plunger rod) in a non-actuating position, and a trigger could be employed to move the release to cause the biasing device to drive the actuator to activate the camera. Other arrangements are available as well, such as ones employing a fulcrum.

The foregoing applications are not exhaustive of the present invention. It will be apparent to those skilled in the art that many more useful applications of the present invention can be made.

Although mast 46 has been found to be very advantageous, other extension members may be more appropriate for various situations. A number of these were noted above, such as devices with wheels. In some situations involving non-linear paths, elongated members which are bendable would be advantageous. The environment where device 1 is used could dictate special members, such as clean water.

In conclusion, herein is presented a device which allows a camera to be mounted, and held remotely by a user. Once mounted in the mounting assembly, the user can position the camera in a location where the user would not otherwise be able to personally hold the camera, and take a photograph of said location.

Having described the invention, it will be apparent to those skilled in the art that alterations and modifications may be made without departing from the spirit and scope of the invention limited only by the appended claims.

What is claimed:

1. A mounting assembly for a mechanically activated remote camera, said camera including a shutter release, said mounting assembly comprising:
   an actuator movable between an actuating position and a non-actuating position for actuating the shutter release of the camera;
   a plunger member for moving said actuator between the actuating position and the non-actuating position;
   a housing for housing said plunger member;
   a biasing device within said housing for biasing said plunger member to move said actuator to one of the non-actuating and actuating positions;
   an operating device for selectively causing said biasing device to effect movement of said actuator to the actuating position; and
   a support for being operatively connected to said housing for supporting said housing and having mounting structure for enabling a camera to be mounted on said support,
   wherein said housing further comprises:
      opposing openings allowing said actuator to pass through said housing and preventing lateral movement of said actuator, said opposing openings enabling movement of said actuator between the actuating position and the non-actuating position; and
      a bottom cap for preventing said plunger member and said biasing device from exiting said housing.

2. A mounting assembly for a mechanically activated remote camera, said camera including a shutter release, said mounting assembly comprising:
- an actuator movable between an actuating position and a non-actuating position for actuating the shutter release of the camera;
- a plunger member for moving said actuator between the actuating position and the non-actuating position;
- a housing for housing said plunger member;
- a biasing device within said housing for biasing said plunger member to move said actuator to one of the non-actuating and actuating positions;
- an operating device for selectively causing said biasing device to effect movement of said actuator to the actuating position; and
- a support for being operatively connected to said housing for supporting said housing and having mounting structure for enabling a camera to be mounted on said support,
- wherein said plunger member further comprises an actuator opening having a longitudinal axis, said actuator passing through said actuator opening.

3. A mounting assembly according to claim 2, wherein said actuator opening is internally threaded and wherein said actuator includes cooperating external threads, said actuator being threaded through said threaded actuator opening along said longitudinal axis.

4. A mounting assembly for a mechanically activated remote camera, said camera including a shutter release, said mounting assembly comprising:
- an actuator movable between an actuating position and a non-actuating position for actuating the shutter release of the camera;
- a plunger member for moving said actuator between the actuating position and the non-actuating position;
- a housing for housing said plunger member;
- a biasing device within said housing for biasing said plunger member to move said actuator to one of the non-actuating and actuating positions;
- an operating device for selectively causing said biasing device to effect movement of said actuator to the actuating position; and
- a support for being operatively connected to said housing for supporting said housing and having mounting structure for enabling a camera to be mounted on said support,
- wherein said support further comprises:
  - a housing hole for allowing said housing to pass through said support for securing said housing to said support; and
  - a tripod hole for accommodating a pivotable camera mount for pivoting and tilting said camera.

5. A mounting assembly according to claim 1, wherein said opposing openings are opposing slots.

6. A mounting assembly according to claim 1, wherein said biasing device is a spring.

7. A mounting assembly according to claim 4, wherein said housing hole has an interior thread, and said housing is a tube having an exterior thread corresponding to the interior thread of said housing hole.

8. A mounting assembly according to claim 7, further comprising a lock nut for being threaded on said tube up to the bottom of said support for preventing said support from disengaging said tube.

9. A mounting assembly according to claim 1, wherein said biasing device biases said plunger member to move said actuator to the non-actuating position.

10. A mounting assembly for a mechanically activated remote camera, the camera including a shutter release, said mounting assembly comprising:
- an actuator movable between an actuating position and a non-actuating position for actuating the shutter release of the camera, said actuator including external threads;
- a plunger rod for moving said actuator between the actuating position and the non-actuating position, said plunger rod comprising:
  - an actuator opening having a longitudinal axis, said actuator opening including internal threads for mating with the external threads of said actuator, said actuator being threaded through said actuator opening along said axis;
- a housing for housing said plunger rod;
- a biasing device for biasing said plunger rod to the non-actuating position within said housing, said housing comprising:
  - opposing openings allowing said actuator to pass through said housing and for preventing movement of said actuator between the actuating position and the non-actuating position;
  - a bottom cap for preventing said plunger rod and said biasing device from exiting said housing;
- a base plate operatively connected to said housing for supporting said housing and for being connected to a camera, said base plate comprising:
  - a housing hole for allowing said housing to pass through said base plate for securing said housing to said base plate; and
  - a tripod hole for accommodating a pivotable camera mount for pivoting and tilting said photography and video device.

11. The combination of a mounting assembly for a mechanically actuated remote camera including a shutter release, and a mast for connection to said mounting assembly, said mounting assembly comprising:
- an actuator movable between an actuating position and a non-actuating position for actuating the shutter release the camera;
- a plunger member for moving said actuator between the actuating position and the non-actuating position;
- a housing for housing said plunger rod;
- a biasing device within said housing for biasing said plunger rod to move said actuator to one of the non-actuating and actuating positions;
- an operating device for selectively causing said biasing device to effect movement of said actuator to the actuating position;
- a support for being operatively connected to said housing for supporting said housing and having mounting structure for enabling a camera to be mounted on said support;
- said mast comprising:
  - an elongated pole for attachment to said support, said elongated pole having a longitudinal axis; and
  - a camera assembly mount connected to an end portion of said elongated pole, said camera assembly mount having a mounting device for mounting said camera assembly to said elongated pole, said camera assembly mount being rotatable about the longitudinal axis of said elongated pole and tiltable with respect to said longitudinal axis for rotating and tilting said support and a camera mounted on said support.

* * * * *